United States Patent [19]
Williams

[11] 3,722,661
[45] Mar. 27, 1973

[54] ARTICLE CONVEYOR SYSTEM

[76] Inventor: Ralph L. Williams, 3609 Manhattan, Maplewood, Mo. 63143

[22] Filed: May 19, 1971

[21] Appl. No.: 144,758

[52] U.S. Cl..................................198/76, 198/198
[51] Int. Cl..............................................B65g 37/00
[58] Field of Search....198/76, 75, 195, 198; 141/99, 141/190

[56] References Cited

UNITED STATES PATENTS

| | | | |
|---|---|---|---|
| 1,482,467 | 2/1924 | Harrington | 141/190 X |
| 2,628,010 | 2/1953 | Ray et al. | 141/99 |
| 1,528,357 | 3/1925 | Zwicky | 198/195 X |
| 2,784,835 | 3/1957 | Dixon | 198/198 |
| 3,055,488 | 9/1962 | Stone | 198/198 |
| 3,389,777 | 6/1968 | Rysti | 198/76 |

FOREIGN PATENTS OR APPLICATIONS 959,897  3/1957  Germany..............................198/198

Primary Examiner—Richard E. Aegerter
Assistant Examiner—Hadd S. Lane
Attorney—Bedell and Burgess

[57] ABSTRACT

A conveyor system for moving large quantities of articles through relatively small tunnels prevents blocking of restricted passages or tunnels by the articles by including a pair of belts in side-by-side relation with each other, and intermittently halting the belts individually during their movement, with one belt continuing to move while the other is halted. Preferably the tunnel sides taper slightly outwardly from the inlet portal to the outlet portal which is correspondingly wider than the inlet portal, and the upper article-supporting surface of the belts are roughened to enhance frictional engagement with the supported articles. The belts may consist of short molded sections each having an integral sprocket chain link formed on its underside and pinned to the link part of the adjacent sections. For use in electrical treating apparatus, the belt sections are of dielectric material and may be perforated extensively. The belts are driven by a pneumatic cylinder and piston assembly through a one-way clutch so that if either belt becomes jammed, it can fully stop during the power stroke of its piston, and will be free to move rearwardly to relieve the jam during the reverse stroke of its piston.

16 Claims, 7 Drawing Figures

INVENTOR:
RALPH L WILLIAMS
BY Bedell & Burgess
ATTORNEYS.

INVENTOR:
RALPH L. WILLIAMS
BY Bedell & Burgess
ATTORNEYS.

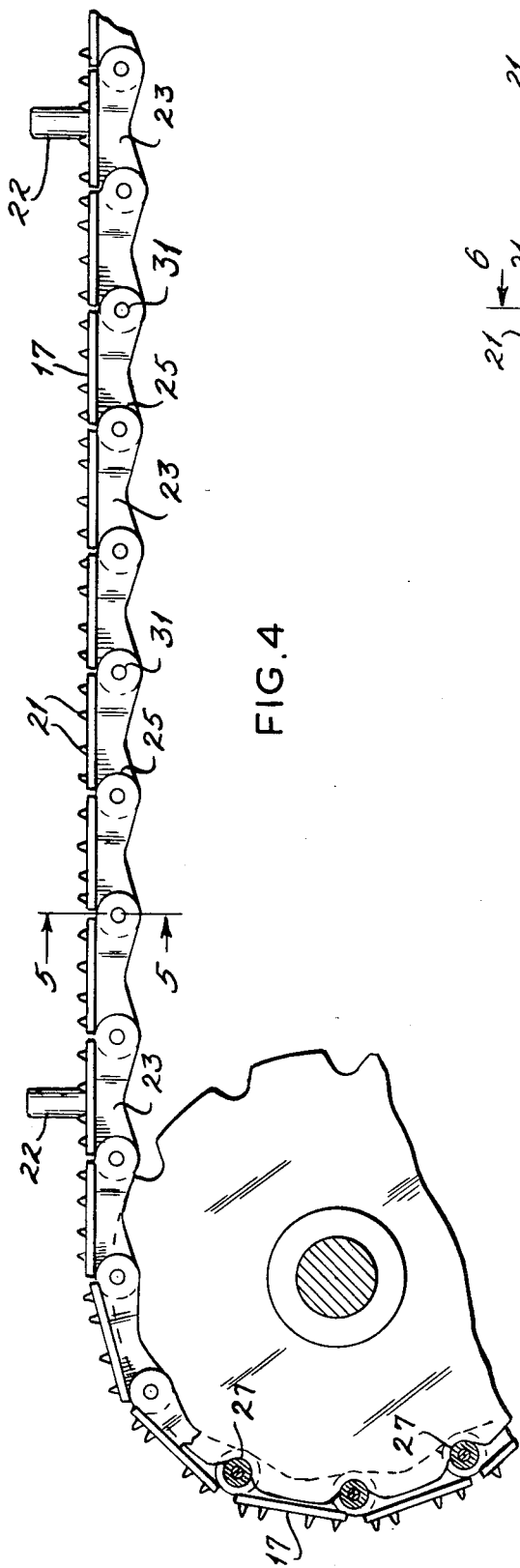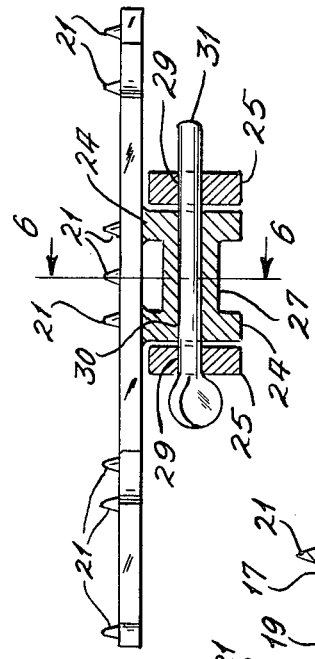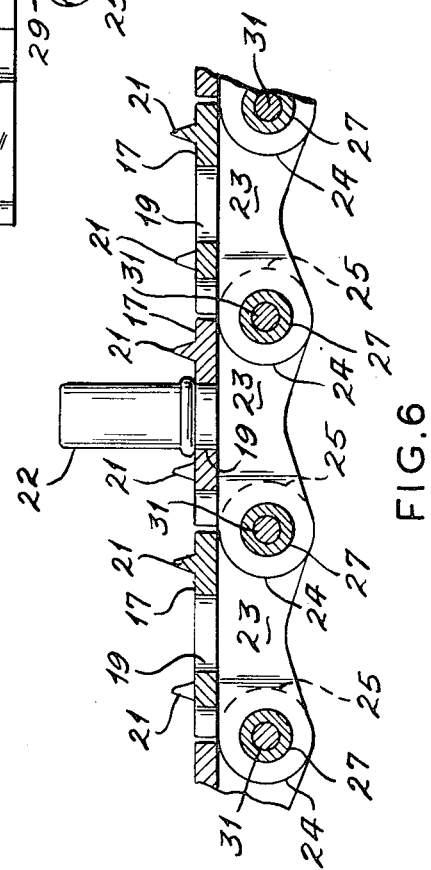

ARTICLE CONVEYOR SYSTEM

BACKGROUND OF THE INVENTION

1. Field of the Invention

The invention relates to belt conveyor systems and more particularly to a conveyor for quantities of articles constructed to prevent blocking of restricted passageways by the articles.

2. The Prior Art

Conventional conveyor systems utilize a single belt for moving articles deposited haphazardly on the belt frequently become blocked by the articles if the conveyor passes through a restricted passage such as a tunnel.

SUMMARY OF THE INVENTION

The invention provides a conveyor system for three-dimensional articles in which jamming of the articles in restricted passageways such as tennels is prevented by utilizing a pair of conveyor belts in side-by-side relation and having their driving means constructed to halt the individual belts intermittently, with one belt continuing to move while the other is halted. The invention includes means for freeing either belt to halt or move rearwardly in the event a jam occurs, so as to prevent damage to the apparatus and relieve the jam. Additional objectives include the provision of one-piece molded belt sections each incorporating an integral sprocket chain-link, the provision of a dielectric belt suitable for electric treating apparatus, the arrangement of a conveyor belt tunnel to enhance the effect of the dual belts and reduce the likelihood of jamming.

BRIEF DESCRIPTION OF THE DRAWINGS

FIG. 4 is an enlarged elevational view of a portion of the conveyor belt of FIG. 3 and one of the sprockets.

FIG. 5 is a transverse vertical sectional view along line 5—5 of FIG. 4.

FIG. 6 is a longitudinal vertical sectional view along line 6—6 of FIG. 5.

DESCRIPTION OF THE PREFERRED EMBODIMENT

Figure 1:
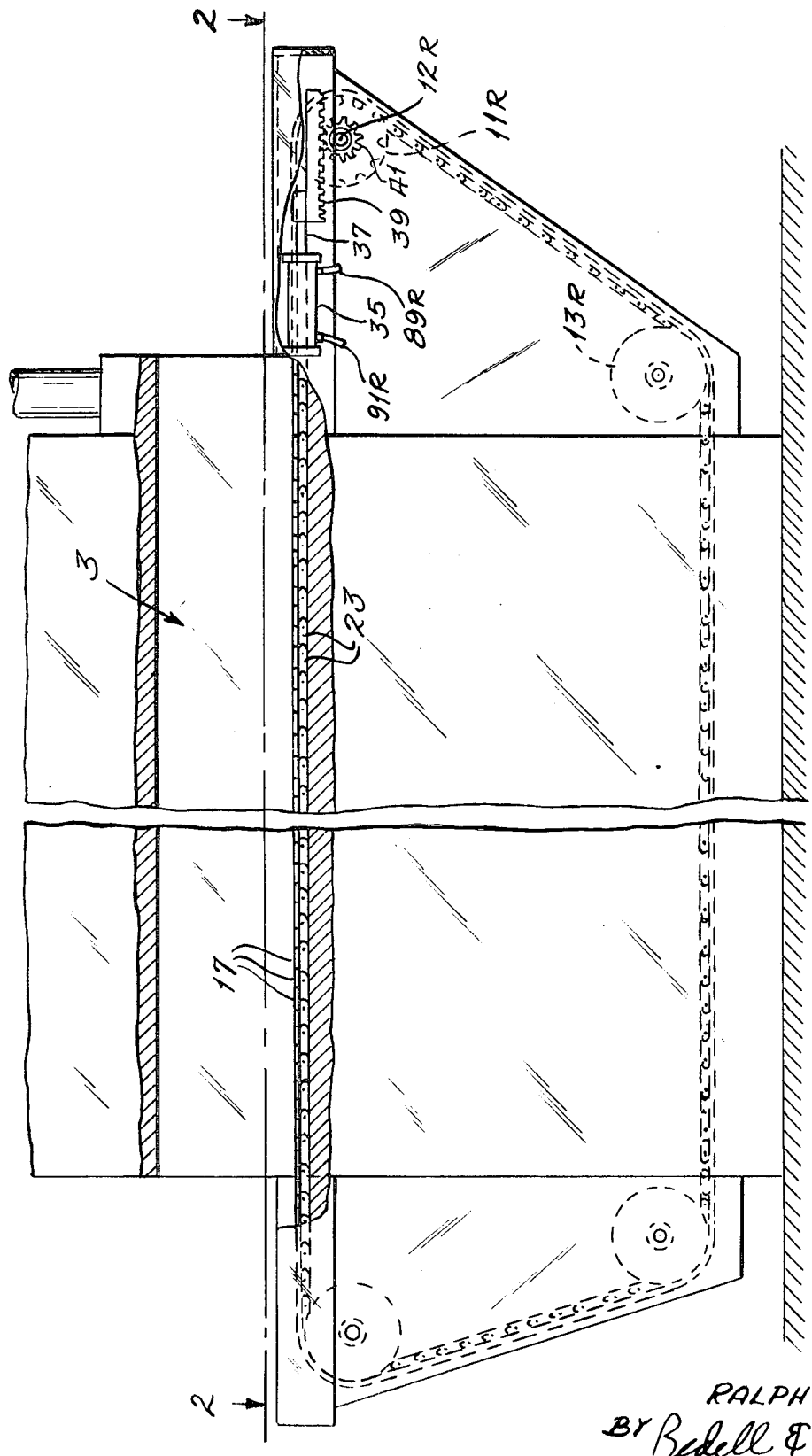
FIG. 1 is a side elevational view partially sectionalized of apparatus incorporating the invention.
Figure 2:
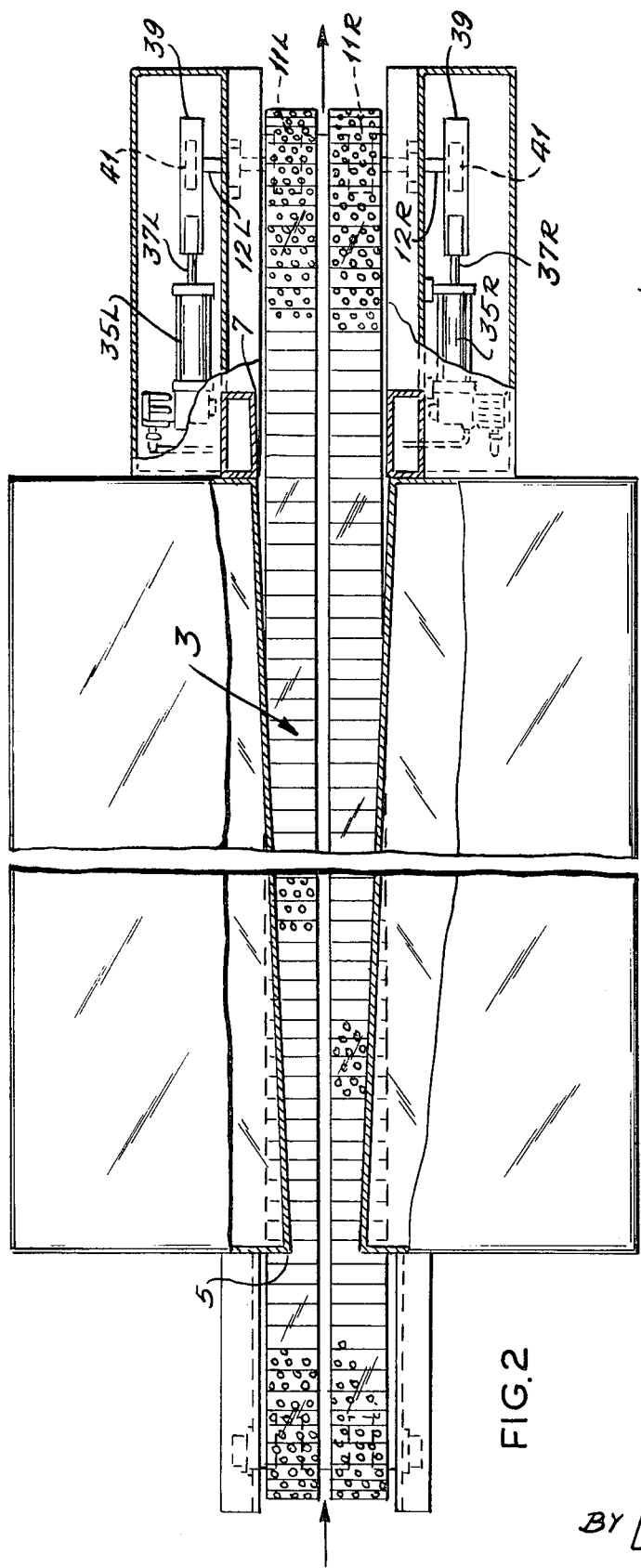
FIG. 2 is an enlarged top view, partially sectionalized of the apparatus illustrated in FIG. 1.
Figure 3:
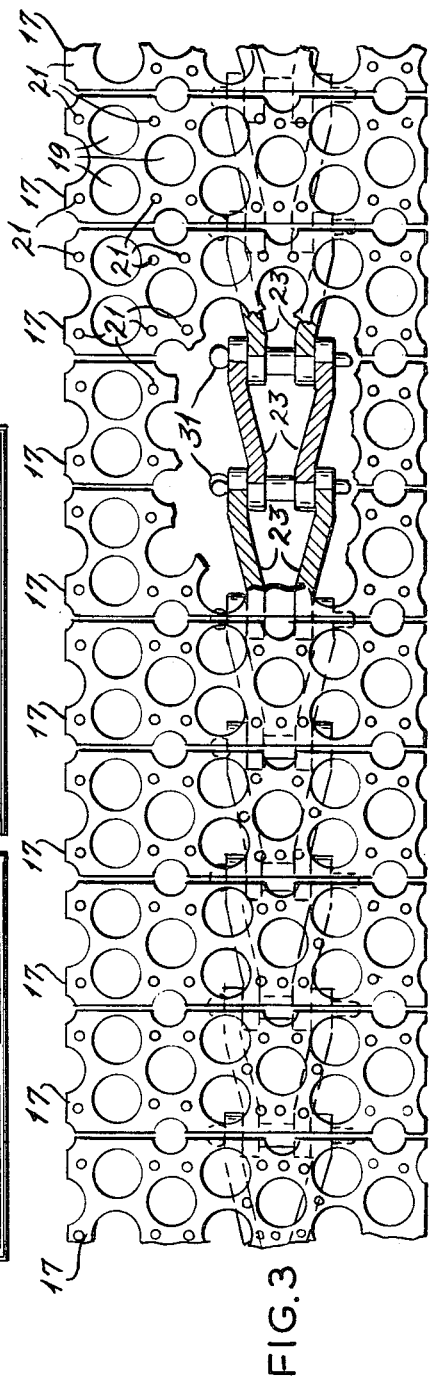
FIG. 3 is a top view partially sectionalized of a portion of a conveyor belt constructed in accordance with the invention.

The numeral 1 refers to a box-like housing for apparatus, which may be of the type disclosed in my U.S. Pat. No. 3,484,363 for electrically treating plastic bottles and the like, and which includes a tunnel 3 through which the bottles must pass for treatment.

Tunnel 3 has a relatively narrow inlet portal 5 and a slightly wider outlet portal 7, to reduce the likelihoof of the bottles or other articles jamming as they are moved through the tunnel.

For moving the articles through the tunnel expeditiously and avoiding any interference with electrical treatment effected vertically through the tunnel, a conveyor comprising a pair of endless belts 9L and 9R passes through the tunnel, over independent driving sheaves or sprockets 11R and 11L at the outlet end, under bottom idler sprockets 13L and 13R near the base of apparatus 1, and over inlet idler sprockets 15L and 15R at the inlet end of the tunnel.

Belts 9L and 9R are formed of hard dielectric plastic material in short sections approximately equal in length to the circular pitch of the sprockets. Each section includes an upwardly facing plate 17 perforated by closely spaced holes 19, which serve to lighten the belt and facilitate the passage therethrough of electrostatic discharges. To improve frictional engagement of the belt with articles carried by it, the flat upper surface of each section plate 17 between holes 19 is formed with numerous small generally conical bosses 21, and to further assure movement of the articles with the belt, some sections spaced apart from each other are fitted with upstanding pins 22 in a central hole 19. The bottom surface of each plate 17 is formed with closed pintle chain links comprising a pair of transversely spaced longitudinally extending ribs 23, bent toward each other such that their inner vertical surfaces at one end 24 are spaced apart transversely a slightly greater distance than their outer surfaces at the other end 25. At their closely spaced ends, ribs 23 are connected by a hollow transverse cylindrical member 27 which forms a pintle for engagement with the sprocket teeth and both ends of each rib are pierced with transversely aligned pairs of holes 29 and 30 spaced apart the same distance as the circular pitch of the sprockets. Pins 31 of the same material as the belt sections pass through the aligned holes 29 and 30 in adjacent ends of the links formed by ribs 23 to couple the links and associated belt section plates together while accommodating their articulation.

For driving drive sprockets 11R and 11L independently of each other such that one may rotate while the other is halted and vice versa, the drive sprocket bracket mounts individual drive mechanism at each side of the conveyor, the mechanisms are identical and each comprises a double-acting pneumatic cylinder 35 having its piston rod 37 extending parallel to the conveyor. Piston rod 37 mounts a toothed rack 39, which meshes with a pinion 41. The latter incorporates a one-way clutch 43 mounted on one of the drive sprocket shafts 12L or 12R such that movement of piston rod 37 and rack 39 to the right and consequent clockwise movement of its pinion 41 will produce clockwise movement of the associated sprocket shaft 12L or 12R and the sprocket 12L or 12R mounted thereon, which movement will cause advancing or leftward movement of the corresponding conveyor belt 9L or 9R into and through tunnel 3, while movement of piston rod 37 and rack 39 to the left and consequent counterclockwise movement of pinion 41 will produce no movement of the associated sprocket shaft or sprocket and so that, in the event of a jam in the tunnel, the forward movement of the jammed belt will cease even though the associated piston rod is in its power stroke, because of the compressibility of the air, and, as soon as the piston commences its reverse stroke, tension in the jammed belt will pull the belt rearwardly to relieve the jam. Accordingly the movement of each belt 9L and 9R will be intermittent, advancing during outward movement of the associated piston rod 37 and halted during inward movement of the piston rod.

Figure 7:
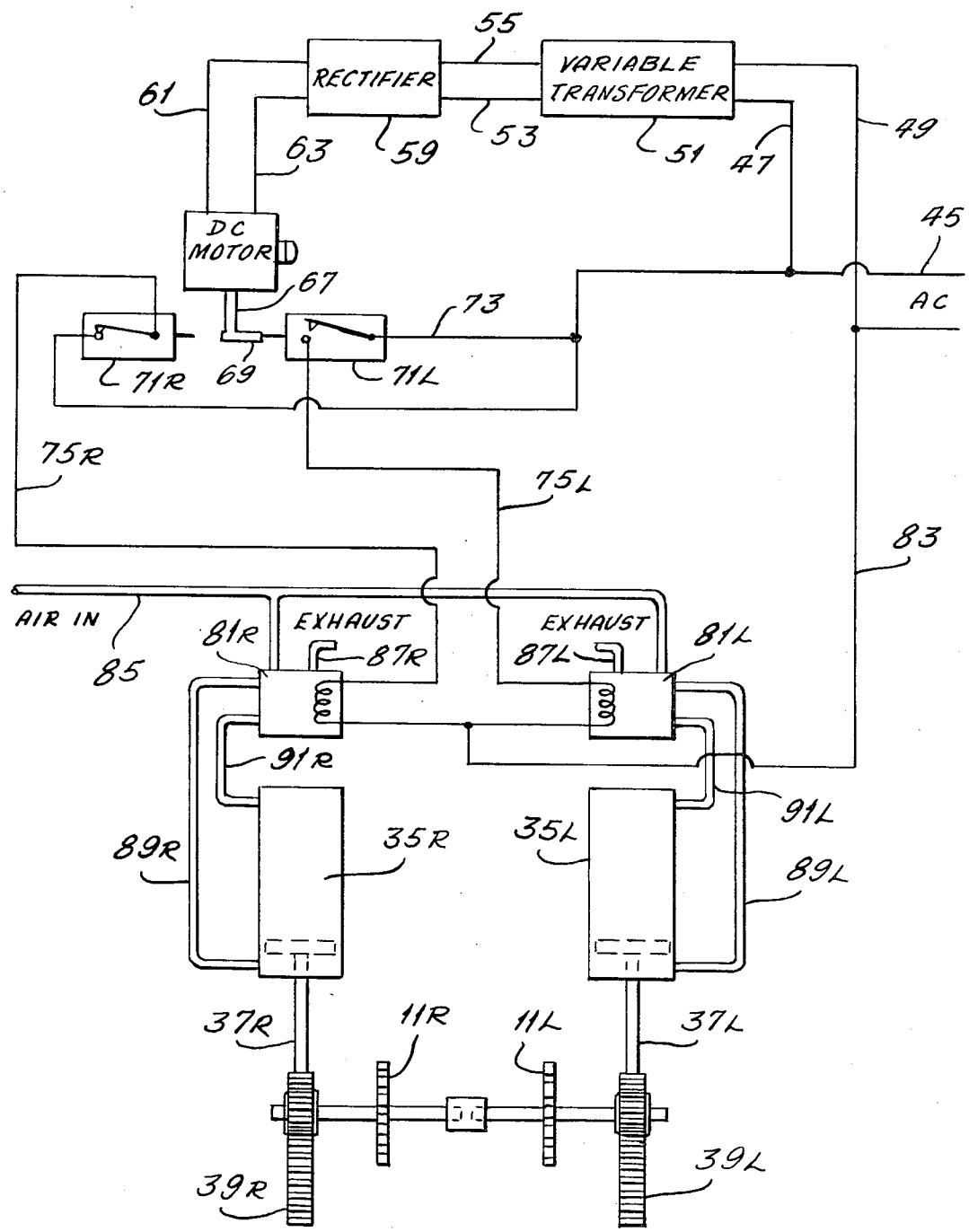
FIG. 7 is a schematic view of the electro-pneumatic control system.

For simultaneously actuating cylinders 35L and 35R in opposite directions and controlling the velocity of their piston rods 37, an electrical control system, as shown schematically in FIG. 7, may be provided. The system comprises a source 45 of AC power, connected by conductors 47 and 49 to the primary winding of a variable transformer 51, the secondary winding of which is connected by conductors 53 and 55 to a rectifier 59. The output of rectifier 59 is fed by conductors 61 and 63 to DC motor 65 so that the speed of the latter is proportional to the variable output of transformer 51 and is thus controllable thereby. Shaft 67 of motor 65 mounts a contact arm 69 on its end for alternate engagement with microswitches 71L and 71R, which are supplied with alternating current from source 45 by conductors 73. Microswitches 71L and 71R are connected respectively by conductors 75L and 75R to solenoid valves 81L and 81R, so as to selectively energize them, their circuit being completed by conductor 83 leading to the AC power source 45.

A source of compressed air including conduit 85 is connected to valves 81R and 81L, each of which has an exhaust outlet 87 and conduit connections 89L, 89R to the rear end of the respective cylinder and conduit connections 91L, 91R to the forward end of the respective cylinder.

Both valves 81L and 81R are normally set to provide communication between air supply conduit 85 and conduits 91L and R when the electircal system is not energized, thus maintaining piston rods 37L and R in the extended position shown in the drawings. Upon alternate energization of the valve solenoids resulting from alternate closure of microswitches 71L and 71R, conduits 91L and 91R are alternately closed and conduits 89R and 89L are opened, alternately retracting piston rods 37L and 37R.

As piston rods 37L and 37R are alternately retracted, their retracting movement is not transmitted to their respective sprockets 11L or 11R because of the action of one-way clutches 43 in pinions 41. Hence, during the alternate retractive movements of the piston rods, the belts 9L and 9R are alternately stopped, while the alternating extending movements of the piston rods are transmitted by racks 39, pinions 41, clutches 43 and shafts 12 to drive sprockets 11L and 11R, to drive belts 9L and 9R forward alternately.

The frequency of the alternate interruptions of belts 9L and 9R can be selectively varied by using variable transformer 51 to vary the AC voltage supplied to rectifier 59 and the DC voltage supplied by the latter to DC motor 65. As the voltage is reduced, the speed of motor 65 is correspondingly reduced, as is the frequency of alternate closure of microswitches 71L and 71R and of operation of valves 81L and 81R.

Preferably valves 81L and 81R are calibrated so that the belt advance or extending movement of the piston rods 37L and 37R is substantially slower than the belt interruption or retracting movement of the piston rods.

Operation of the conveyor system is as follows:
AC power is applied to power leads 47 and 49 and variable transformer 51 is set to the voltage required for the desired frequency of interruption of belts 9L and 9R, thereby varying the voltage on DC motor 65 and the frequency with which motor shaft arm 69 engages microswitches 71L and 71R. Upon engagement of motor arm 69 with microswitch 71L and closure of the latter, conductor 75L is energized, connecting conduit 89L to exhaust outlet 87L and connecting conduit 91L to sir supply conduit 85, thereby causing piston rod 37L to retract, during which movement of the piston rod sprocket 11L and belt 9L remain stationary because of the action of one-way clutch 43L. Upon completion of the forward piston stroke and opening of microswitch 71L as motor arm 69 rotates, valve 81L connects conduit 91L to exhaust outlet 87L and connects air supply conduit 85 to conduit 91L, thereby projecting piston rod 37L, and through rack 39L, pinion 41L, clutch 43L and shaft 12L driving sprocket 11L clockwise (from the viewpoint of FIG. 1) and thereby advancing belt 9L until piston rod 37L reaches the outer end of its stroke.

During the operation of the left-hand side of the conveyor, described above, piston rod 37R has been in the projected position and remains there, with no movement of belt 9R. As soon as arm 69 on DC motor shaft 67 engages microswitch 71R the solenoid of valve 81R is energized, causing valve 81R to vent air conduit 91R to exhaust and connect air conduit 89R to air supply line 85, causing retraction of piston rod 37R, but no corresponding movement of sprocket 11R and belt 9R, because of one-way clutch 43R. As DC motor shaft arm 69 continues to rotate away from microswitch 71R and the latter opens, valve 81R returns to its normal position, exhausting air conduit 89R and connecting conduit 91R to air supply line 85 and thereby projecting piston rod 37R at a predetermined slow speed, to drive sprocket 11R and advance belt 9R at a proportionate speed. As DC motor 65 continues to rotate, alternately actuating microswitches 71L and 71R, belts 9L and 9R will alternate their advances and interruptions. Assortments of objects, such as plastic bottles B fed haphazardly onto the adjacent inlet end of belts 9L and 9R will be propelled through tunnel 3 by the belts. In the event of a blockade by a jumble of the bottles, the movement of one belt while the other is stopped, as described above, will tend to move any bottles crossways of the tunnel to a diagonal or axial position, thus releasing the blockage. Particularly stubborn bottles will be engaged by pins 22 and thus be propelled to a nonblocking position. The increasing width of tunnel 3 from inlet to outlet will also facilitate the clearance of blockades. In the event that this fails to break the blockade, the moving belt can stop even though the piston is in its power stroke because of the compressibility of the air in the cylinder, and as soon as the associated piston rod commences its reverse stroke, because the the associated one-way clutch, the jammed belt will be free to move rearwardly responsive to its own tension to free the articles from the blockade, after which the normal cycle of operation will resume.

Details of the conveyor system disclosed herein may be varied substantially without departing from the spirit of the invention and the use of such modifications as come within the scope of the appended claims is contemplated.

I claim:

1. An article conveyor system comprising a pair of belts in side-by-side relation, means for driving said belts separately from each other with alternating interruptions and advances of each belt with respect to the other, and a tunnel forming a passageway for said belts and having inlet and outlet portals, said outlet portal being larger than said inlet portal and said tunnel tapering outwardly from its inlet to its outlet end.

2. An article conveyor system according to claim 1 wherein the transverse dimension of said outlet portal is greater than that of said inlet portal and the sides of said tunnel are correspondingly tapered outwardly from their inlet to outlet ends.

3. An article conveyor system according to claim 1 wherein said belt-driving means comprises a pair of pneumatic motors, separate driving sheaves, operative connections between said motors and said driving sheaves respectively.

4. An article conveyor system according to claim 3 wherein said motors comprise double-acting pneumatic cylinders and said operative connections comprise racks driven by said cylinders, pinions meshing with said racks, and means for transmitting rotary motion from said pinions respectively to said driving sheaves in one direction only.

5. An article conveyor system according to claim 4 including means for alternately reversing the direction of said racks.

6. An article conveyor system according to claim 5 including a source of compressed air, said reversing means valve means connected to said source and having separate connections to the opposite ends of said cylinders.

7. An article conveyor system according to claim 6 including control means for actuating said valve means to alternately reverse the air connections to said cylinders.

8. An article conveyor system according to claim 7 in which said control means includes a source of electric energy and said valve means is electroresponsive.

9. An article conveyor system according to claim 8 wherein said valve means comprises a pair of valves including solenoid actuators, said valves being connected respectively to said cylinders, said control means being connected to said solenoid actuators and including means for alternately energizing them.

10. An article conveyor system according to claim 8 wherein said valves normally connect said air source to the ends of said cylinders to advance said belts, said solenoid actuators alternately causing said valves to connect said air source to the end of said cylinders to interrupt said belts alternately.

11. An article conveyor system according to claim 1 wherein said driving sheaves are sprockets and said belts mount elements on their underside matingly engageable with the teeth of said sprockets.

12. An article conveyor system according to claim 11 wherein said belts are in short sections each comprising a rectangular plate formed with a pintle chain link on their undersides, there being pintle elements connecting said plates to each other and accommodating their articulation around said sprockets.

13. An article conveyor system according to claim 12 wherein the upper surfaces of said plates are formed with a plurality of small bosses for frictional engagement with articles carried by the conveyor.

14. An article conveyor system according to claim 13 wherein some of said plates mount upstanding pins for propelling engagement with articles carried by the conveyor.

15. An article conveyor system according to claim 13 wherein said plates are extensively perforated.

16. An article conveyor system according to claim 15 including upstanding pins fitted into some of said plate perforations.

* * * * *